(12) United States Patent
Elias

(10) Patent No.: US 9,249,860 B2
(45) Date of Patent: Feb. 2, 2016

(54) FOLLOW FOCUS

(71) Applicant: Vitec Videocom GmbH, Eching (DE)

(72) Inventor: James Elias, Eching (DE)

(73) Assignee: VITEC VIDEOCOM GMBH, Eching (DE)

( * ) Notice: Subject to any disclaimer, the term of this patent is extended or adjusted under 35 U.S.C. 154(b) by 228 days.

(21) Appl. No.: 14/146,217

(22) Filed: Jan. 2, 2014

(65) Prior Publication Data

US 2014/0190299 A1    Jul. 10, 2014

(30) Foreign Application Priority Data

Jan. 4, 2013  (DE) .................... 20 2013 000 087 U

(51) Int. Cl.
| | |
|---|---|
| *H04N 5/232* | (2006.01) |
| *G03B 17/00* | (2006.01) |
| *F16H 1/14* | (2006.01) |
| *G03B 13/32* | (2006.01) |
| *G03B 17/56* | (2006.01) |
| *F16H 57/12* | (2006.01) |

(52) U.S. Cl.
CPC *F16H 1/14* (2013.01); *G03B 13/32* (2013.01); *G03B 17/568* (2013.01); *F16H 2057/126* (2013.01); *Y10T 74/19665* (2015.01)

(58) Field of Classification Search
CPC .... G02B 23/2476; G02B 27/40; G03B 17/48; G03B 13/18; G03B 19/18; G03B 5/00; A61B 1/04; F16M 11/10; F16M 11/18; F16M 11/2014; F16M 13/00; H04N 5/23212; H04N 5/23287
USPC ............................... 348/345, 357; 396/79, 83
See application file for complete search history.

(56) References Cited

U.S. PATENT DOCUMENTS

| | | | |
|---|---|---|---|
| 3,479,944 A | 11/1969 | Barr | |
| 3,650,504 A | 3/1972 | Dormody | |
| 4,156,567 A | 5/1979 | Ostrowski | |
| 4,353,634 A | 10/1982 | Himmelsbach | |
| 4,885,950 A | 12/1989 | Smith | |
| 6,024,664 A | 2/2000 | Shaffner | |

(Continued)

FOREIGN PATENT DOCUMENTS

| | | |
|---|---|---|
| CA | 2663343 A1 | 10/2010 |
| DE | 1937173 | 3/1966 |

(Continued)

*Primary Examiner* — Trung Diep
(74) *Attorney, Agent, or Firm* — Fellers, Snider, Blankenship, Bailey & Tippens, P.C.

(57) ABSTRACT

A follow focus for cameras, in particular film cameras, comprising a bevel gear having a first rotary axis (11) and a second rotary axis (13) arranged at an angle, in particular a right angle, to one another, a first transmission mechanism (26, 27) for transmitting the rotation of one of the axes (11) onto the other axis (13) by means of a positive locking connection acting in the direction of rotation of the axes, and a second transmission mechanism (28, 30) for transmitting the rotation of one of the axes (11) onto the other axis (13) by means of a frictional connection acting in the direction of rotation of the axes, wherein the rotation of the one axis (11) can be transmitted to the other axis (13) by means of the frictional connection of the second transmission mechanism (28, 30) until the frictional connection of the second transmission mechanism (28, 30) is overpowered and after the frictional connection has been overpowered it can be transmitted primarily by the positive locking connection of the first transmission mechanism (26, 27).

11 Claims, 1 Drawing Sheet

(56) References Cited

U.S. PATENT DOCUMENTS

| | | | |
|---|---|---|---|
| 7,626,633 B2* | 12/2009 | Okamoto | F16M 11/18 |
| | | | 348/373 |
| 9,106,814 B2* | 8/2015 | Lochner | F16M 11/10 |
| 2003/0173494 A1* | 9/2003 | Nakamura | G02B 7/08 |
| | | | 250/201.2 |
| 2008/0012944 A1* | 1/2008 | Lu | H04N 5/2252 |
| | | | 348/207.1 |
| 2008/0225234 A1 | 9/2008 | Bauer et al. | |
| 2010/0259669 A1 | 10/2010 | Wood | |
| 2013/0100341 A1* | 4/2013 | Codd | B66F 11/048 |
| | | | 348/373 |

FOREIGN PATENT DOCUMENTS

| | | |
|---|---|---|
| DE | 1290422 | 3/1969 |
| DE | 2716679 | 10/1978 |
| DE | 9415170 U1 | 9/1994 |
| DE | 102004015947 | 10/2005 |
| DE | 202006013864 | 12/2006 |
| EP | 2752711 | 7/2014 |
| JP | 63-151911 | 6/1988 |
| JP | 07-333701 | 12/1995 |
| JP | 2000-253297 | 9/2000 |

* cited by examiner

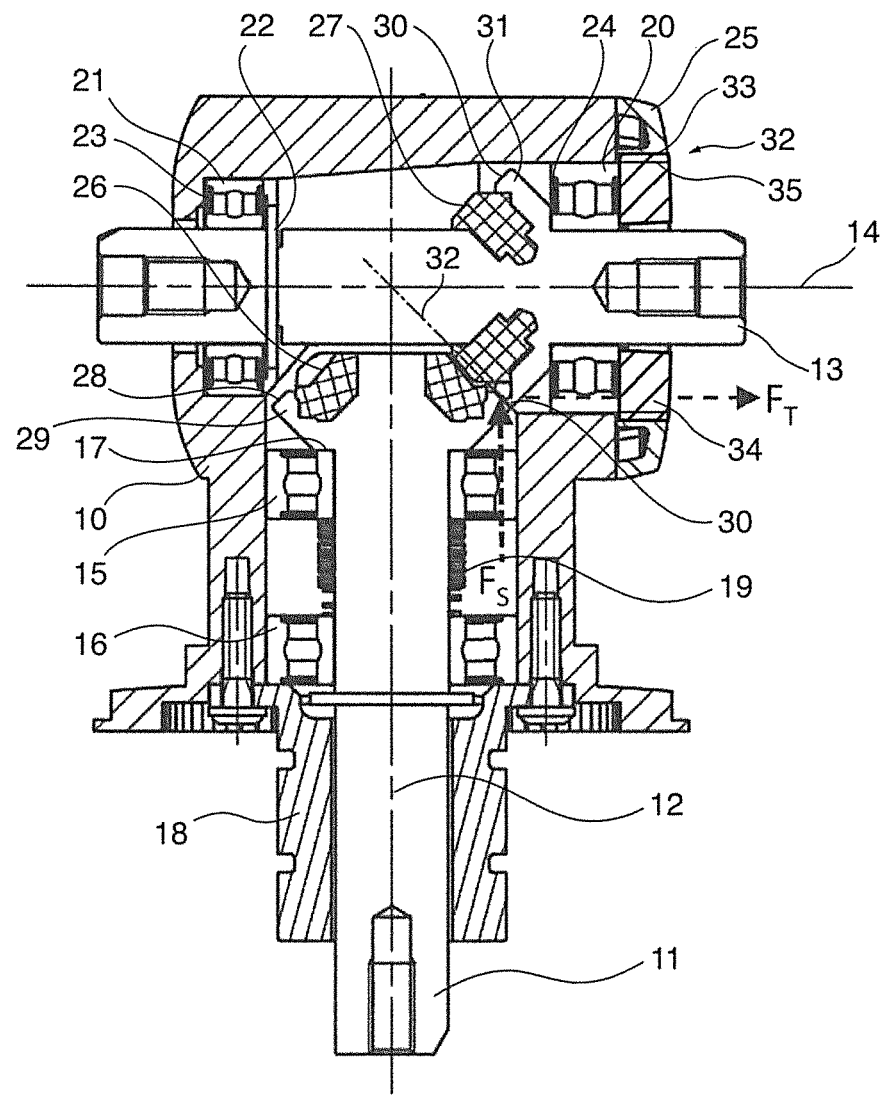

FOLLOW FOCUS

CROSS REFERENCE TO RELATED APPLICATION

This application claims the benefit of German Utility Model Patent Application No. 20 2013 000 0872.2 filed Jan. 4, 2013, herein incorporated by reference in its entirety for all purposes.

FIELD OF THE INVENTION

The present invention relates to a focus finder which is often also referred to as a "follow focus". Such follow focus devices are used in cameras, in particular in film cameras, to transmit rotational movements to the focus adjustment ring, the zoom adjustment ring or the aperture adjustment ring of a camera lens.

BACKGROUND OF THE INVENTION

Follow focus devices allow the constant and precise adjustment of the focus, which is indispensable for the definition of the image when the distance of the camera to the object to be photographed changes during an exposure.

The use of such a follow focus makes it possible for the camera assistant responsible for image definition to easily rotate the focus adjustment ring without having to directly take hold of the lens.

Existing follow focus devices, such as those known, for example, from CA 26 63 343 A1 or DE 94 15 170 U1, comprise a bevel gear with which the rotation generated by the camera assistant is transmitted via intermeshing gear wheels from a first axis to a second axis. However, such gear wheels comprise a certain backlash, and therefore with manual rotation, particularly when the direction of rotation is changed, the backlash must first of all be overcome. In order to minimize this backlash, the gear wheels are often produced with a high degree of precision and low tolerances. This results in high costs of production. Moreover, even with precision manufacturing it is not possible to completely eliminate the backlash. Yet even a small degree of backlash can disturb or distract the camera assistant from his work. The work of a camera assistant has to be carried out with a high level of concentration and backlash results in the operation of the mechanism feeling imprecise. This occurs particularly in the case of slow focus operations and changes in the direction of rotation.

In order to counter this negative feeling, grease dampers were provided in the state of the art, which were supposed to convey the feeling to the camera assistant that there was no backlash. However, these systems did not overcome the disadvantage that the rotation by the camera assistant did not immediately lead to a rotation of the focus adjustment ring but only after the backlash had been overcome.

SUMMARY OF THE INVENTION

Against the background described above, the object of the present invention was to provide a follow focus with which a direct transmission of the rotation could be realized particularly in the case of slow and smooth rotations but with which a reliable transmission would still be ensured even in the case of fast movements.

This object is achieved by a follow focus having the features of claim 1. Advantageous embodiments of the present invention can be found in the subclaims as well as in the description below.

The present invention is based on the idea of realizing the transmission of rotation between two axes of the bevel gear by means of largely independent transmission mechanisms, one of which being configured with play for the transmission of high forces and the other being configured without play for the transmission of low forces. Thus, a direct, i.e. play-free, transmission from one axis to the other axis can be realized without play in the case of slow and smooth rotational movements or changes in direction. In the case of fast movements, however, when a high force acts on the transmission mechanisms and when the operator does not notice a certain play which does not have a negative impact on the adjustment, it is primarily the other mechanism that acts, and therefore a reliable transmission of the rotation is ensured even with fast movements and transmissions of high forces. The transmission mechanism can be supported in this by the above-mentioned transmission mechanism. It is particularly preferred that the first mechanism transmits the rotational force frictionally from one axis to the other, while the second mechanism preferably transmits this force by means of a positive-locking connection. According to a particularly preferred embodiment of the invention, the first mechanism is therefore formed by contact surfaces frictionally in contact with one another in the direction of rotation, while in a preferred embodiment the other mechanism is realized by intermeshing gear wheels, in particular bevel wheels.

Accordingly, the present invention defines a follow focus or a focus finder for cameras, in particular for film cameras, comprising a bevel gear. The bevel gear comprises a first rotary axis and a second rotary axis arranged at an angle, in particular a right angle, i.e. a 90° angle, to one another. In order to transmit the rotation of one of the axes to the other, a first transmission mechanism is provided. This transmits the rotation by means of a positive locking connection acting in the direction of rotation of the axes. This can be realized, for example, by means of gear wheels, in particular bevel wheels, which are accordingly non-rotatably connected to the axes. Alternatively, a geared belt drive would also be conceivable. Furthermore, a second transmission mechanism is provided. This produces a frictional connection or non-positive connection acting in the direction of rotation of the axes for the transmission of the rotation of one of the axes onto the other axis. This frictional connection or non-positive connection makes it possible for a transmission of rotation to take place until the adhesive force is overpowered. If the adhesive force or the frictional connection is overpowered, the first transmission mechanism takes effect, which brings about the transmission of rotation primarily by means of the positive locking connection thereof. The second transmission mechanism makes possible a play-free, i.e. a direct and immediate, transmission of the rotation from one of the axes to the other by means of the frictional connection thereof. In other words, it is thereby made possible that the camera assistant responsible for the focus adjustment will not notice play in the gears and, moreover, such play does not exist. This means that the manual rotation initiated in one of the axes is transmitted directly and without a loss of motion to the other axis. Since the frictional connection takes effect particularly in the case of slow movements, a sufficient and reliable transmission of force can be ensured. If, however, a fast rotation is initiated, a transmission of the rotation can be ensured even if the adhesive force or frictional connection is overpowered, by means of the provision of the first transmission mechanism which operates by means of a positive locking component. With such fast movements, the direction of rotation is only rarely changed and precise focusing is generally not necessary so that the play is not noticed and does not lead to the operator having a negative experience.

According to one embodiment of the present invention, the second transmission mechanism comprises a first contact surface which is non-rotatably connected to the axis and a second contact surface which is non-rotatably connected to the second axis, the contact surfaces being frictionally in contact with one another for the transmission of the rotation. Thus, an inexpensive and simple configuration of the second transmission mechanism is ensured. For example, the contact surfaces may be formed by a cylinder rolling on a board.

Since forces act between the contact surfaces, it is preferable that the first and second contact surfaces extend in cross section at an angle corresponding to the angle bisector of the angle between the first axis and the second axis. This ensures that any forces that may be initiated always act in the axial direction of the first and second axes and therefore do not influence the rotation of the axes. Moreover, this has the advantage that, as described in more detail below, bearing play can be automatically balanced out by one axis being axially urged and an axial urging also being effected on the other axis by the transmission of forces.

Moreover, it is preferable for cost reasons both with respect to the manufacture and to the assembly that the first and/or second contact surfaces are formed of the same material as the respective axes. Preferably, the contact surfaces are formed by at least one part of the surface area of a conical portion also formed of the same material as the first or second axis.

In order to be able to balance out axial play, it is preferable that the first and second axes are slidably mounted in the axial direction and that the first axis is urged in the direction of the second axis. Furthermore, this advantageously results in that the two contact surfaces are pressed against one another so that a more secure frictional connection between the contact surfaces during operation is ensured and, moreover, any abrasion to the contact surfaces as a result of wear can be automatically compensated for.

Moreover, it is preferable to mount the first axis by means of two bearings (a first bearing and a second bearing) in a housing of the bevel gear, while the second axis is radially guided by means of a pilot bearing and a third bearing is mounted in the housing of the bevel gear. In order to automatically balance out the axial bearing play during assembly without having to rely on further measures, it is preferable that the first axis is urged by a spring element in the direction of the second axis, the spring element acting between the first bearing and the second bearing. This causes the first and second bearings to be forced apart and they are automatically held in a play-free manner in the housing in the axial direction while the first axis is axially urged by one of the bearings. By transmitting the force from one axis to the other in the axial direction thereof, for example via the contact surfaces described (see above), the other axis is also urged in the axial direction and the bearing thereof (the third bearing) is also positioned in the axial direction in a play-free manner in the housing, without the need for complex alignment and assembly processes here such as adjustment with distance washers.

Furthermore, it is preferable to provide an adjustment device by means of which the third bearing of the second axis can be adjusted in the axial direction, i.e. can be moved in the axial direction by means of the adjustment device. It is preferable in this respect that the adjustment device is an element which can be fixed in different positions even in the axial direction, preferably continuously, and which is indirectly or directly in contact with the third bearing of the second axis, in particular with the outer ring of the bearing. For example, the continuous adjustment may take place by means of a screw thread. The adjustability of the third bearing of the second axis makes it possible to equalize the transmission ratio between the first transmission mechanism and the second transmission mechanism, thereby preventing the two transmission mechanisms from working against one another.

According to a further embodiment and when gear wheels are used as the first transmission mechanism, it is advantageous, as above, also with respect to the second transmission mechanism to form at least one gear wheel, advantageously both gear wheels, of the same material as, i.e. integrally with, the corresponding axes.

Further advantages and features of the present invention which can be implemented alone or in combination with one of the features described above, insofar as the features are not contradictory, can be found in the following description of a preferred embodiment.

BRIEF DESCRIPTION OF THE DRAWINGS

This description is given with reference to the accompanying drawing:

FIG. 1, which shows a bevel gear of a follow focus according to an embodiment of the present invention in cross section.

DETAILED DESCRIPTION OF THE PREFERRED EMBODIMENTS

The bevel gear shown in FIG. 1 comprises a gearbox housing 10. A first axis 11, which can be rotated about a first axis of rotation 12, is arranged in the gearbox housing 10. Moreover, a second axis 13 is incorporated in the gearbox housing 10, which can be rotated about a second axis of rotation 14. The axes 11, 13 are arranged at a right angle to one another in the gearbox housing 10, i.e. the axes of rotation 12 and 14 intersect at an angle of 90°.

The first axis 11 is rotatably mounted in the gearbox housing 10 by means of a first bearing 15 and a second bearing 16. The first bearing 15 lies at the end thereof that is opposite the second bearing 16 viewed in the axial direction at a shoulder 17 of the first axis 11. The second bearing 16 is held in the axial direction at the end thereof that faces the first bearing 15 viewed in the axial direction by means of a cover 18 which is screwed together with the gearbox housing 10. A pressure spring 19 is arranged between the first bearing 15 and the second bearing 16, which is supported at the facing ends of the bearings 15 and 16 viewed in the axial direction. The first axis 11 is slidably mounted in the housing 10 in the axial direction thereof by means of mounting the first axis 11 in the bearings 15 and 16.

The second axis 13 is rotatably mounted in the gearbox housing 10 by means of a third bearing 20 and a pilot bearing 21. The pilot bearing 21 is fixed in the gearbox housing 10 firstly by means of a ring 22 and by means of a lug 23 of the gearbox housing 10 in the axial direction of the second axis 13 and slidably guides the second axis 13 radially in the axial direction thereof. The third bearing 20 is supported, viewed in the axial direction of the second axis 13, at the end thereof facing the pilot bearing 21 at a shoulder 24 of the second axis 13. The third bearing 20 is held by a flange 25 at the end facing the pilot bearing 21 in the axial direction.

At the front end of the first axis 11, i.e. facing the second axis 13, there is a first gear wheel 26 in the form of a bevel wheel. Moreover, a second gear wheel 27 also in the form of a bevel wheel is arranged on the second axis 13. The first gear wheel 26 and the second gear wheel 27 intermesh. A certain backlash is present between the teeth of the gear wheels 26 to 27. Furthermore, in the embodiment shown the gear wheels 26 to 27 are produced separately from the axes 11 and 13 and are non-rotatably connected to these. However, it goes without saying that it may be advantageous to produce the gear wheels 26 and/or of the same material as, i.e. integrally or in one piece with, the axes 11 and 13.

Moreover, the axis 11 comprises a first contact surface 28 non-rotatably connected thereto. This first contact surface is formed as part of a surface area of a conical portion 29 produced of the same material as the first axis 11. The second axis 13 also comprises a contact surface 30 as a portion of the surface area of a conical portion 31 which is formed of the same material as the second axis 13. However, it goes without saying that the contact surfaces 28 and 30 may also be surfaces of a separately produced part connected in an arbitrary manner to the corresponding axes 11, 13. The contact surfaces 28 and 30 are frictionally in contact with one another. They are pressed against one another by means of the spring 19.

As can be seen from the cross section shown in FIG. 1, the contact surfaces 28, 30 extend on a line 32 corresponding to the angle bisector of the angle between the first axis 11 and the second axis 13, i.e. the axes of rotation 12 and 14.

In the following, the mode of operation of the follow focus and of the bevel gear described herein as well as the assembly thereof will be explained.

To assemble the bevel gear according to the invention, the second axis 13 is first mounted with the pilot bearing 21 and the third bearing 20 which is not axially pre-loaded, and the flange 25 is screwed together with the housing 10. Next, the axis 11 is inserted with first bearings 15 and 16 which are not axially pre-loaded, and the cover 18 is screwed on. The bearing 16 is pressed against the cover 13 by means of the spring 19, while the bearing 15 is pressed against the shoulder 17 of the first axis 11. In this way, the first axis 11 moves until the contact surface 28 comes into contact with the contact surface 30. In doing so, the force $F_s$ from the spring 19 is converted via the contact surfaces 28 and 30 into a force $F_T$ on the second axis 13, with the contact surfaces 28 and 30 being reliably pressed against one another on the one hand and the second axis 13, being urged in the axial direction, holding the bearing 20 between the shoulder 24 and the flange 25 on the other. Thus, the bearings 15, 16, 20 can automatically be mounted axially pre-loaded, in particular with no axial play, without the need for complex assembly processes such as e.g. adjustment with distance washers. Rather, this takes place automatically as a result of the provision of the spring 19 and the sliding of the respective axes against the bearings via the contact surfaces 28 and 30. Since the second axis 13 is only urged to the right via the spring 19 and the force transmission $F_T$ in FIG. 1, the pilot bearing 21 has to be held in a non-play-free manner in the axial direction. Moreover, the problem may arise that the transmission ratios of the first and second transmission mechanisms, i.e. between the contact surfaces 28 and 30, or the gear wheels 26 and 27, are not identical. In this case, there is the risk that the two transmission mechanisms will work against one another. In order to equalize the transmission ratios, it is therefore preferable to provide an adjustment device 32. This is realized, for example, by an internal screw thread being provided in the flange 25, in which a threaded ring 34 having an external screw thread 35 is accommodated. The threaded ring 34 lies with the side thereof which faces inward at the outer ring of the third bearing 20. By twisting the threaded ring 34 the axial position of the third bearing 20 can be adjusted and as a result of this position so can the transmission ratio of the contact surfaces 29 and 30 in order to adapt this ratio to the transmission ratio of the gear wheels 26, 27. In order to be able to twist the threaded ring 34 it may be advantageous to provide two or more diametrically opposed openings in the threaded ring 34 with which a corresponding tool engages.

For aesthetic reasons it may be advantageous to cover the threaded ring 34 and the flange 35 with a further cover not shown.

To operate the follow focus, the first axis 11 is rotated by a camera assistant responsible for the focus adjustment. There is a non-positive connection or frictional connection between the contact surfaces 28 and 30. As long as this frictional connection or non-positive connection is not overpowered by the force initiated by the rotation, the transmission of the rotation takes place exclusively via the frictional connection of the contact surfaces 28 and 30 with one another (the second transmission mechanism), while the gear wheels 26 and 27 do not contribute to the transmission of the rotation, i.e. are not effective. Since the frictional transmission of rotation takes place without a loss of motion, a rotation of the first axis 11 is transmitted directly and immediately onto the second axis 13 (a play-free transmission). This is expedient in particular with slow movements and slow changes in the direction of rotation.

If the transmission of force takes place via the rotation with a fast movement, which results in the adhesive force of the contact surfaces 28 and 30 being overpowered, the contact surfaces slip and the teeth of the gear wheels 26, 27 engage (the first transmission mechanism) in order to transmit the rotation of the first axis 11 in this case to the second axis 13. Owing to the fast and therefore vigorous movement, the loss of motion associated therewith to overcome the backlash does not lead to the function and feel for the operator being impaired since a very quick movement is desired in any case. With this transmission (the first transmission mechanism) it may be that the contact surfaces, i.e. the frictional connection which is still effective (the second transmission mechanism), also contribute to a certain extent to the transmission of the rotation, i.e. until the adhesive force is overpowered a rotational movement is implemented and therefore the teeth of the gear wheels 26, 27 are released.

In view of the statements above, the follow focus according to the invention leads on the one hand to slow precise rotational movements being able to be transmitted without a loss of motion, i.e. without play, from one axis to the other, while on the other hand fast movements can also be reliably transmitted owing to the provision of the gear wheels even if changes to the direction of rotation and precise rotational movements only rarely occur. On the other hand, the follow focus offers a simple and therefore economical means of assembly, in particular to be able to mount the bearing of the axes in a play-free manner and in particular without axial play.

It goes without saying that the present invention is not restricted to the embodiment described above; rather, various modifications are possible without leaving the scope of the present invention as defined in the patent claims below.

What is claimed is:

1. A follow focus for cameras, in particular film cameras, comprising
   a bevel gear having
   a first rotary axis (11) and a second rotary axis (13) +arranged at an angle, in particular a right angle, to one another;
   a first transmission mechanism (26, 27) for transmitting the rotation of one of the axes (11) onto the other axis (13) by means of a positive locking connection acting in the direction of rotation of the axes; and a second transmission mechanism (28, 30) for transmitting the rotation of one of the axes (11) onto the other axis (13) by means of a frictional connection acting in the direction of rotation of the axes, wherein the rotation of the one axis (11) can be transmitted to the other axis (13) by means of the frictional connection of the second transmission mechanism (28, 30) until the frictional connection of the second transmission mechanism (28, 30) is overpowered and after the frictional connection has been overpowered it can be transmitted primarily by the positive locking connection of the first transmission mechanism (26, 27).

2. The follow focus according to claim 1, wherein the second transmission mechanism comprises a first contact surface (28) which is non-rotatably connected to the first axis (11) and a second contact surface (30) which is non-rotatably connected to the second axis (13), wherein the contact surfaces (28, 30) are frictionally in contact with one another for transmitting the rotation.

3. The follow focus according to claim 2, wherein the first contact surface (28) and the second contact surface (30) extend in cross section at an angle corresponding to the angle bisector of the angle between the first axis (11) and the second axis (13).

4. The follow focus according to claim 2, wherein the first contact surface (28) and/or the second contact surface (30) is formed by at least one part of the surface area of a conical portion (29, 31) formed of the same material as the corresponding first axis (11) or second axis (13).

5. The follow focus according to one of the preceding claims, wherein the first axis (11) and the second axis (13) are slidably mounted in the axial direction and the first axis (11) is urged in the direction of the second axis (13).

6. The follow focus according to claim 5, wherein the first axis (11) is mounted in a housing (10) of the bevel gear by means of a first and a second bearing (15, 16) and the second axis (13) is radially guided by means of a pilot bearing (21) and a third bearing (20) is mounted in the housing (10) of the bevel gear, wherein the first axis (11) is urged in the direction of the second axis (13) by a spring element (19) acting between the first and second bearings (15, 16) such that the first, second and third bearings are axially pre-loaded.

7. The follow focus according to claim 6, wherein furthermore an adjustment device (32) is provided, by means of which the axial position of the third bearing (20) of the second axis can be adjusted.

8. The follow focus according to claim 7, wherein the first transmission mechanism comprises a first gear wheel (26) which is non-rotatably connected to the first axis (11) and a second gear wheel (27) which is non-rotatably connected to the second axis (13), which are engaged.

9. The follow focus according to claim 8, wherein the first gear wheel (26) and/or the second gear wheel (27) is formed of the same material as the corresponding first axis (11) or second axis (13).

10. The follow focus according to claim 3, wherein the first contact surface (28) and/or the second contact surface (30) is formed by at least one part of the surface area of a conical portion (29, 31) formed of the same material as the corresponding first axis (11) or second axis (13).

11. The follow focus according to claim 1, wherein the first transmission mechanism comprises a first gear wheel (26) which is non-rotatably connected to the first axis (11) and a second gear wheel (27) which is non-rotatably connected to the second axis (13), which are engaged.

* * * * *